US009638242B2

(12) United States Patent
Andersen et al.

(10) Patent No.: US 9,638,242 B2
(45) Date of Patent: May 2, 2017

(54) HIGH-CONTRAST ENGINE CONNECTING ROD

(71) Applicant: Ford Motor Company, Dearborn, MI (US)

(72) Inventors: Gene Reed Andersen, Northville, MI (US); Jimmy Darrell Parker, Alger, OH (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 14/867,507

(22) Filed: Sep. 28, 2015

(65) Prior Publication Data
US 2017/0089386 A1    Mar. 30, 2017

(51) Int. Cl.
*F16C 7/02* (2006.01)
*B23D 31/00* (2006.01)
*B41M 3/00* (2006.01)
*B21K 1/76* (2006.01)

(52) U.S. Cl.
CPC .............. *F16C 7/023* (2013.01); *B21K 1/766* (2013.01); *B23D 31/003* (2013.01); *B41M 3/00* (2013.01)

(58) Field of Classification Search
CPC .......... F16C 7/02; F16C 7/023; B23D 31/003; B41M 3/00; B41M 5/26; B21K 1/766; B23P 2700/04; B23K 26/362; B23K 26/364; B23K 2201/34
USPC .................................... 29/DIG. 16
See application file for complete search history.

(56) References Cited

U.S. PATENT DOCUMENTS

| 5,666,637 | A | * | 9/1997 | Fujiki | ........................ B22F 5/10 29/DIG. 31 |
| 8,011,271 | B2 | * | 9/2011 | Kubota | .................. B21K 1/766 74/579 R |
| 8,074,355 | B1 | * | 12/2011 | Cleary | ................... B21D 53/84 123/197.3 |
| 2005/0126660 | A1 | * | 6/2005 | Kubota | ................... F16C 9/045 148/210 |

FOREIGN PATENT DOCUMENTS

| JP | S60172590 | A | | 9/1985 | | |
| JP | 2000334584 | A | | 12/2000 | | |
| KR | 20020012651 | A | | 2/2002 | | |
| TW | GB 2246099 | A | * | 1/1992 | ............. | B41J 5/102 |
| TW | EP 2782043 | A1 | * | 9/2014 | ............. | B41M 5/26 |

* cited by examiner

*Primary Examiner* — Adam D Rogers
(74) *Attorney, Agent, or Firm* — Damian Porcari; Brooks Kushman P.C.

(57) ABSTRACT

After a connecting rod for an engine is formed, it is broken or fractured at a fracture point to allow the connecting rod to assemble around a portion of a crankshaft. However, before fracturing the connecting rod, the connecting rod is provided with a layer of paint across the eventual fracture point such that when the connecting rod is fractured the paint extends across both sides of the fracture point. Also before fracturing the connecting rod, serial numbers or symbols are etched into the paint on either side of the eventual fracture point. These serial numbers are unique to that connecting rod, and have similar indicia on either side of the connecting rod. The combination of the paint and serial numbers increase the ability of an assembly worker to assure matching parts of an original connecting rod are re-attached during assembly about the crankshaft.

16 Claims, 2 Drawing Sheets

HIGH-CONTRAST ENGINE CONNECTING ROD

TECHNICAL FIELD

The present disclosure relates to a connecting rod for an engine. More particularly, this disclosure relates to a connecting rod and an associated manufacturing method for improving visibility of information on the connecting rod and throughput during assembly.

BACKGROUND

In a reciprocating piston engine, a connecting rod connects a piston to a crank or crankshaft. Rotational movement of the crankshaft rotates the connecting rod about the central axis of the crankshaft, which causes linear movement of the piston.

Connecting rods can be made of steel, aluminum, or the like. Modern, typical connecting rods are either forged or sintered, but other methods of manufacturing are known. Connecting rods can initially be formed as one solid piece (through the forging, sintering, etc.). After a connecting rod has been formed and allowed to cool, it can be severed to create a line of separation near the main opening of the rod. The rod is thus broken into two pieces. This allows the rod to be assembled over the crankshaft, at which time the rod is bolted or otherwise fastened back together around the crankshaft.

SUMMARY

In one embodiment, a method includes forming a single-piece connecting-rod body, applying a strip of paint over a portion of the connecting-rod body, and laser-etching a first ID code and a second ID code onto the strip of paint. After the applying, the connecting-rod body is fractured into a main body portion and a cap portion with a fracture line extending across the strip of paint and between the first and second ID codes.

In another embodiment, a connecting rod for an engine is provided. The connecting rod has a main-body portion, and a cap portion connected to the main-body portion at a fracture line. A strip of paint has a first region on the main-body portion and a second region on the cap portion. The strip extends over the fracture line. A first serial number is provided on the first region, and a second serial number is provided on the second region.

In yet another embodiment, a method includes providing a connecting rod main body and a separate connecting rod cap configured to attach to the main body to form a connecting rod. A strip of paint is provided to span over both the main body and the cap. A first serial number is laser-etched into the strip of paint on the main body and a second serial number is laser-etched into the strip of paint on the connecting rod cap.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
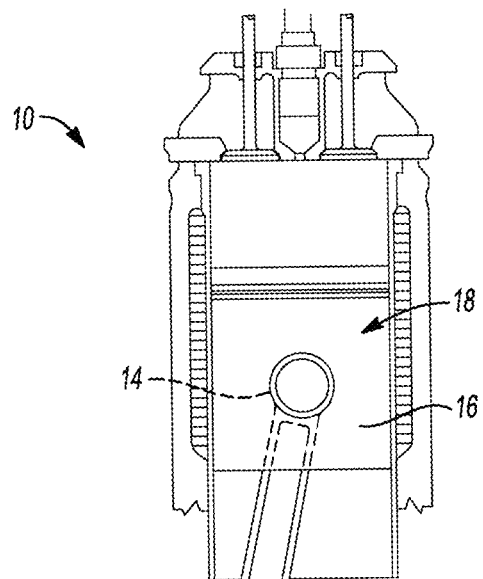
FIG. 1 is a side view of a piston within a combustion chamber of an engine and connected to a crankshaft via a connecting rod.

FIG. 1 illustrates one embodiment of a piston and combustion region 10 within an engine. This illustration is merely exemplary for purposes of showing context around a connecting rod 12; the structure surrounding the connecting rod 12 is not meant to be limiting on this disclosure, as the connecting rod 12 can work in a plethora of engines.

One end 14 of the connecting rod 12 is mounted to a pin within a skirt 16 of a piston 18. Another end 20 of the connecting rod 12 is mounted to a crankpin 22. The crankpin 22 is offset from and rotates about a central axis of a crankshaft 24. Thus, the connecting rod 12 connects the crankshaft 24 to the piston 18. As the crankshaft 24 rotates, the end 20 of the connecting rod 12 rotates about a central axis of the crankshaft 24. Linear movement of the piston 18 (e.g., from combustion) causes rotary movement of the crankshaft 24, which in turn causes to movement of other downstream powertrain components to drive the vehicle. Conversely, rotation of the connecting rod 12 from the powertrain components (e.g., from a starter motor) causes linear movement of the piston 18.

After the connecting rod 12 is formed, it is broken or severed so that it can be reattached about a portion of the crankshaft 24. When the connecting rod is severed into two pieces, it is imperative that the two pieces that were broken apart from one formed connecting rod are the same two pieces that are fastened back together around the crankshaft. If one fractured part of a connecting rod is fastened to a fractured part from a different connecting rod, matching joining surfaces may not exist. This can lead to engine knock or other issues that may affect drivability.

Figure 2:
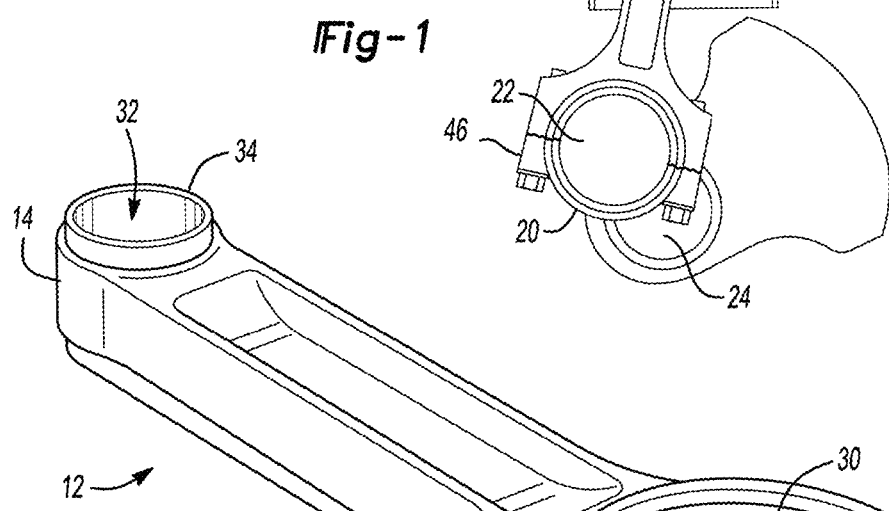
FIG. 2 is a perspective view of the connecting rod of FIG. 1.
Figure 2:
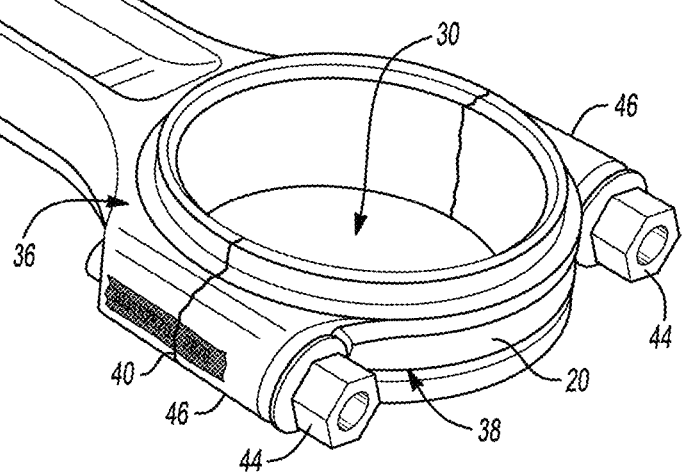

FIG. 2 shows the connecting rod 12 in isolation. The connecting rod 12 is preferably forged or sintered to have a one-piece shape having a one end (small end) 14 and another end (large end) 20. The large end 20 is provided with a bore or opening 30 to receive the crankpin of the crankshaft of the engine. Sidewalls surrounding the opening 30 are forged with the one-piece shape, but can also be drilled and formed by removing material after the one-piece rod is manufactured. The small end 14 is also provided with a bore or opening 32. This opening 32 is provided to receive a pin (not shown) that connects the connecting rod 12 to the piston of the engine. A bushing 34 may be provided in the opening 32 after the forming of the connecting rod in order to receive the pin.

Once the connecting rod 12 is formed as a one-piece rod, it is subjected to prolonged or sudden static mechanical loading at a desired location to fracture the rod 12 into two portions. The two portions created by the fracturing are a main-body portion 36 and a cap portion 38. The main-body portion 36 and the cap portion 38 are separated along a fracture line 40, with each portion having fractured mating surfaces. These mating surfaces can then be rejoined, as explained below.

After fracture, the two separated portions 36, 38 of the connecting rod 12 can then be placed about a portion of the crankshaft and re-mated along the fractured mating surfaces. Fasteners 44 secure the fractured main-body portion 36 and the cap portion 38 to one another about the crankshaft. The fasteners 44 can include bolts, screws, and the like. To accommodate the fasteners 44, shoulders 46 are formed on either side of the connecting rod. Each shoulder includes an aperture to receive the fastener 44.

When the one-piece connecting rod 12 is fractured into two parts (the main-body portion 36 and the cap portion 38), the fracture line 40 extends through the shoulders 46. This ensures that when the two parts are reattached, the fastener extends through both the main-body portion 36 and the cap portion 38.

After fracture and during the subsequent reassembly of the main-body portion 36 and the cap portion 38, it is imperative that the imperative that the main-body portion 36 of one connecting rod 12 is reattached to the cap portion 38 of that same earlier-formed connecting rod 12. This ensures that the fractured mating surfaces at the fracture line 40 are aligned and match with each other. If, for example, a main-body portion 36 of one connecting rod 12 is attached to a cap portion of a different connecting rod, the mating surfaces may not align or match properly. This situation would have the potential to create engine knocking or other issues pertaining to drivability and engine reliability.

According to various embodiments of this disclosure, a specific visual marking system is placed on the connecting rod to aid in assuring the proper portions of the fractured connecting rod are reattached to one another.

Figure 3:
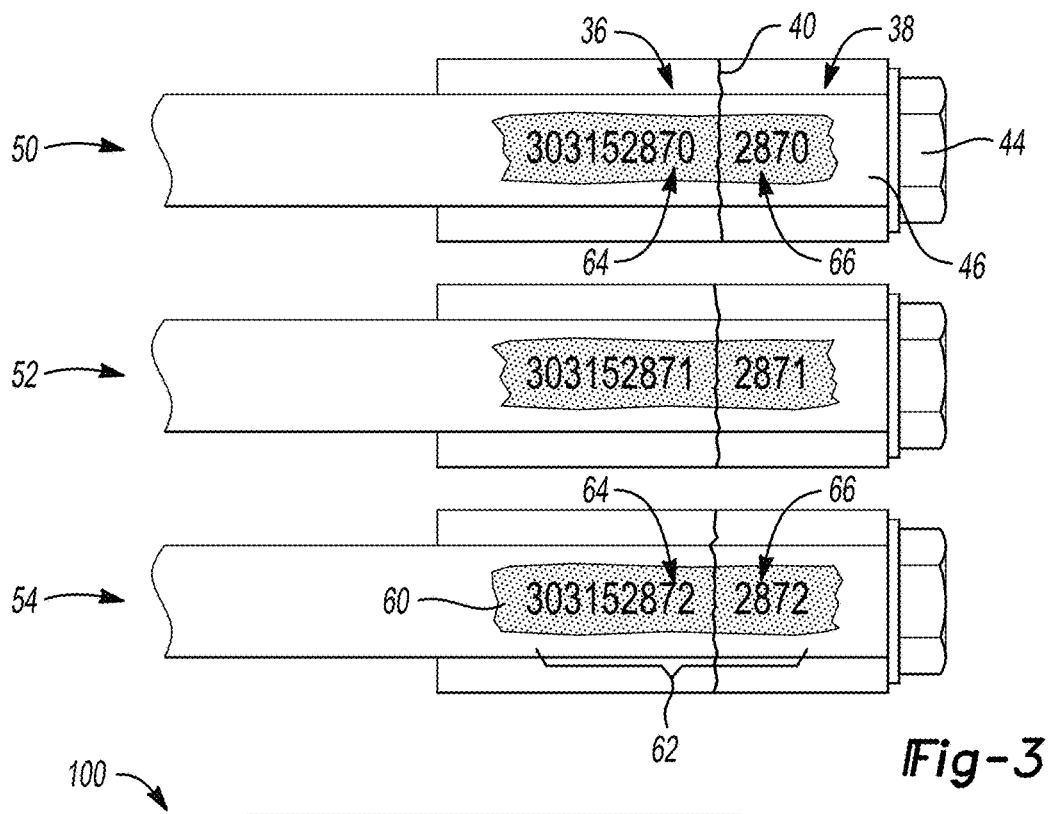
FIG. 3 is a side view of multiple connecting rods, each having a line of paint and serial numbers on either side of a fracture line.

FIG. 3 shows three connecting rods 50, 52, 54. These connecting rods are similar in structure to the connecting rod 12 described above with reference to FIGS. 1-2. One of the shoulders 46 of the connecting rods is visible. Also shown are the fracture lines 40 extending through the connecting rods, separating the rods into their respective main-body portions 36 and cap portions 38.

A layer of paint 60 is applied to the outer surface of the shoulders 46. The paint 60 is preferably applied after forging of the one-piece connecting rod but prior to fracturing the rod into two portions. In another embodiment, it is contemplated that the paint can be applied after fracturing but prior to complete separation and removal of the two parts from one another into different locations. In yet another embodiment, the paint is applied during the forging process prior to the metal cooling to improve adhesion of the paint to the metal. The paint 60 is preferably light in shading, such as white, off-white, yellow, or the like. This improves contrast for serial numbers added to the rods. And, different connecting rods may use different colors, to further reduce the chance to assembling incorrect portions of the connecting rod.

After applying the layer of paint 60, serial numbers 62 are laser-etched into the paint 60 and onto the outer surface of the connecting rod 12. The serial numbers 62 on each connecting rod can include a first set of numbers 64 on the main-body portion 36 and a second set of numbers 66 on the cap portion 38. Each serial number 62 is unique to a respective connecting rod. The serial numbers can be off-white or a darker color to provide a visual contrast with the lighter-colored paint. The serial numbers 62 allow visual inspection and identification of each connecting rod.

The second set of numbers 66 preferably relates to or is derived from the first set of numbers 64. For example, in the embodiment shown in FIG. 3, the first set of numbers 64 for each connecting rod is a 9-digit number (e.g., "303152870," "303152871," and "303152872"). Spaced apart form the first set of numbers 64 is the second set of numbers 66. The second set of numbers 66 is the last four digits of the first numbers 64 of that connecting rod (e.g., "2870," "2871," and "2872".) When the connecting rods 50, 52, 54 are fractured, the fracture lines 40 travel between the first and second sets of numbers 64, 66. Thus, the first set of numbers 64 resides on the main-body portion 36 while the second set of numbers 66 resides on the cap portion 38 after fracture.

The use of two serial numbers that relate to one another improves throughput and accuracy of assembly during engine assembly operations. Assembly workers may be required to review the serial numbers on both the main-body portion 36 and the cap portion 38. If the serial numbers relate (e.g., in the example above, if the second set of numbers 66 is the last four digits of the first set of numbers 64), then the assembly worker can ensure the cap portion 38 is mating with the proper main-body portion 36. The laser-etching of the numbers against a light background improves visibility of the numbers, also improving throughput.

A single paint strip 60 across the fracture line 40 of each connecting rod also improves the ability of the assembly worker to ensure proper reattachment of connecting rod portions. For example, a somewhat irregular or random pattern of a paint strip 60 on either side of the fracture line 40 of one connecting rod allows the assembly worker to inspect the connecting rod and ensure the paint strip matches up along the mating surfaces at the fracture line 40.

Combining both the serial numbers and the paint strip into a single location also improves throughput and reduces the chance for user error. The assembly worker would not have to rotate the part to inspect multiple locations to be confident the proper parts of the connecting rods are being assembled.

The combination of both the serial numbers and the paint strip into a single location also allows for laser-etching of the serial number into and through the paint. Especially when a lighter colored paint is used, the laser-etching improves the contrast of the serial number.

Figure 4:
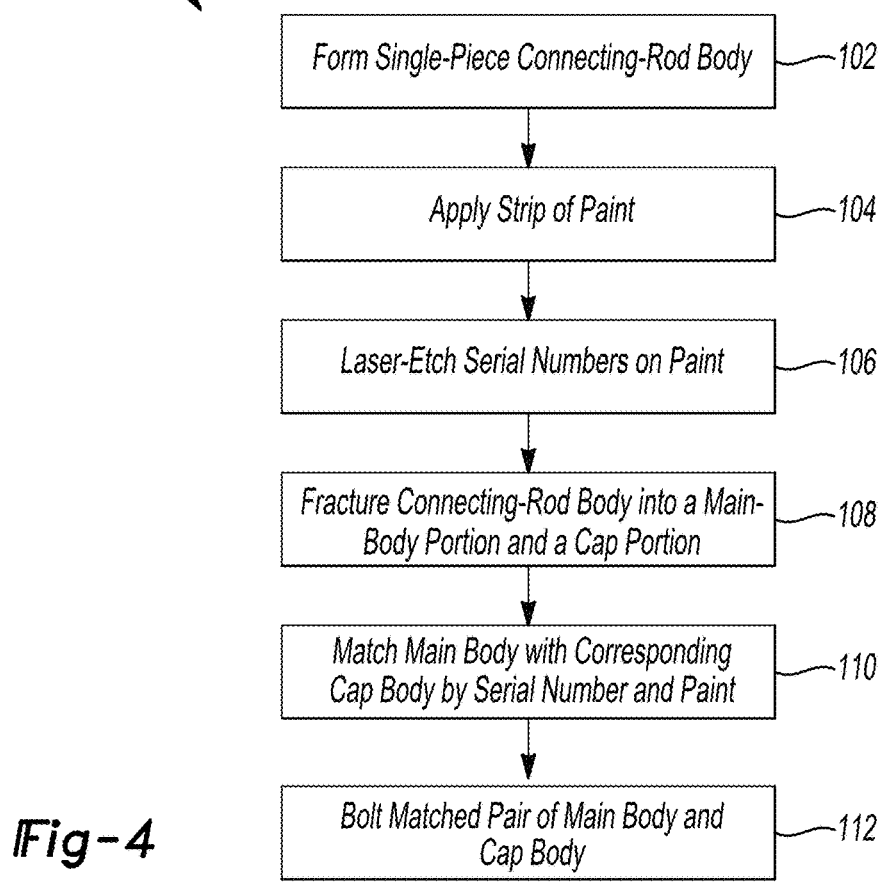
FIG. 4 is a flowchart of a method of manufacturing and assembling a connecting rod.

FIG. 4 is an example of a method 100 of forming and assembling a connecting rod, consistent with the descriptions provided above. At 102, a single-piece connecting rod is formed. As described above, this can be done by a variety of methods. In one embodiment, the connecting rod is formed from forging steel.

Once the single-piece connecting rod is initially formed, a strip of paint can be applied to the outer surface of the connecting rod at 104. This step can be accomplished after the metal has been allowed to cool, or alternatively, during the forging process. At 106, serial numbers are laser-etched into the paint strip. This exposes the underlying metal beneath the paint strip and beneath the extreme outer surface of the connecting rod.

At 108, the connecting rod is subjected to prolonged or sudden mechanical loading to fracture the connecting rod, as described above. This separates the connecting rod into a main-body portion and a cap portion that are later reassembled to one another about the engine crankshaft. The fracturing of the connecting rod is such that a fracture line is located between two different serial numbers or sets of separated numbers.

At 110, an assembly worker is then able to match the main-body portion and the cap portion of the same originally-formed connecting rod and mate them to one another about the crankshaft. As described above, the worker can match the paint strip as well as the serial numbers in one quick visual inspection. With the main-body portion matched and mated with the correct corresponding cap portion, the two portions are fastened together at 112 about the crankshaft as described above. This can be accomplished by sending a bolt through apertures formed in shoulders of the connecting rod.

It should be understood that the serial numbers described above are merely exemplary; any set of serial numbers may be used for either the first set of numbers 64 or the second set of numbers 66. However, it is desirable that the two sets of numbers relate to one another so that visual inspection can ensure that the proper main-body portions 36 and cap portions 38 from the same one-piece connecting rods are reattached. Using numbers is also exemplary. Any characters, such as shapes, symbols, codes, or other forms of identification and the like may be used on either side of the fracture line 40.

It should also be understood that the connecting rod 12 is but one embodiment. Other connecting rods are contemplated. For example, some connecting rods are not straight and include an angular offset for the location of the large end of the rod. The location of the shoulders is also exemplary and not meant to be limited. For example, the shoulders may be circumferentially-offset from the longitudinal central axis of the connecting rod. Thus, the apertures in the shoulders for receiving the fasteners may face a direction offset from the location of the small end of the connecting rod. In such an embodiment, the fracture line may only be required to pass through one of the shoulders. On that particular shoulder is where the serial number and paint strip are preferred to be located. If one of the shoulders is longer than the other shoulder (due to, for example, their circumferentially-offset location), the serial numbers and paint strip are preferred to be located on the longer of the two shoulders.

The processes, methods, or algorithms disclosed herein can be accomplished by manual labor, but can also be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A connecting rod for an engine, comprising:
   a main-body portion;
   a cap portion connected to the main-body portion at a fracture line;
   a strip of paint having a first region on the main-body portion and a second region on the cap portion, the strip extending over the fracture line;
   a first serial number on the first region; and
   a second serial number on the second region.

2. The connecting rod of claim 1, wherein the strip of paint is white and the first and second serial numbers are an absence of white for increased legibility.

3. The connecting rod of claim 2, wherein the second serial number relates to the first serial number to enable a user to verify that the main body portion and the cap portion were fractured from the same connecting rod and are intended to be bolted together.

4. The connecting rod of claim 1, wherein the main-body portion and the cap portion each include rounded outer surfaces and a fastener extending through the rounded outer surfaces.

5. The connecting rod of claim 4, wherein the strip of paint is disposed on the rounded outer surfaces.

6. The connecting rod of claim 1, wherein the first serial number and the second serial number each contain a plurality of identical numerical digits to enable a user to verify that the main body portion and the cap portion were fractured from the same connecting rod.

7. A method comprising:
   forming a single-piece connecting-rod body;
   applying a strip of paint over a portion of the connecting-rod body;
   laser-etching a first ID code and a second ID code onto the strip of paint; and
   after the applying, fracturing the connecting-rod body into a main body portion and a cap portion with a fracture line extending across the strip of paint and between the first and second ID codes.

8. The method of claim 7, further comprising aligning the main body portion and the cap portion at the fracture line such that the strip of paint on the main body portion aligns with the strip of paint on the cap portion, and subsequently bolting the main body portion and the cap portion together into a connecting rod.

9. The method of claim 7, wherein the second ID code relates to the first ID code to enable a user to verify that the main body portion and the cap portion were fractured from the same single-piece connecting-rod body and are intended to be bolted together.

10. A method comprising:
providing a connecting rod main body and a separate connecting rod cap configured to attach to the main body to form a connecting rod;
applying a strip of paint spanning over both the main body and the cap; and
laser-etching a first serial number into the strip of paint on the main body and a second serial number into the strip of paint on the connecting rod.

11. The method of claim 10, further comprising, subsequent to the applying, fracturing the connecting rod into the main body and the cap.

12. The method of claim 11, wherein the fracturing creates a fracture line extending across the strip of paint.

13. The method of claim 12, further comprising aligning the main body and the cap at the fracture line such that the strip of paint on the main body aligns with the strip of paint on the cap, and subsequently bolting the main body and the cap together.

14. The method of claim 12, wherein the fracture line extends between the first and second serial numbers.

15. The method of claim 11, wherein the second serial number relates to the first serial number to enable a user to verify that the main body and the cap were fractured from the same connecting rod and are intended to be bolted together.

16. The method of claim 10, wherein the connecting rod is a first connecting rod, the method further comprising repeating the steps of providing, applying, and laser etching for a second connecting rod, wherein the strip of paint on the second connecting rod is a different color than the strip of paint on the first connecting rod.

* * * * *